United States Patent Office 3,849,479
Patented Nov. 19, 1974

3,849,479
DIMETHYL DIAMINOMALEATE
Robert Walter Begland, Wilmington, Del., assignor to E. I. du Pont de Nemours and Company, Wilmington, Del.
No Drawing. Filed Sept. 29, 1972, Ser. No. 293,541
Int. Cl. C07d 97/02
U.S. Cl. 260—482 P    5 Claims

ABSTRACT OF THE DISCLOSURE

The novel compound dimethyl diaminomaleate, useful as a curing agent for epoxy resins, is prepared by the reduction of 3,4-di(methoxycarbonyl)-1,2,5-selenadiazole with hydrogen sulfide. The new compounds 3,4-di(methoxycarbonyl)-1,2,5-selenadiazole and dimethyl diaminomaleate hydrochloride are also produced.

BACKGROUND OF THE INVENTION

1. Field of the Invention

This invention is concerned with a new simple amino ester which has for a long time eluded the efforts of synthetic chemists.

2. Prior Art

Diaminomaleonitrile,

has been known for almost 100 pears. Repeated efforts to apply known procedures for hydrolyzing cyano groups to obtain the corresponding esters have failed to yield the desired esters from this compound.

R. Huisgen et al., Chem. Ber. 99 (8) 2526–45 (1966); Chem. Abstracts, 65, 15316h (1966), reported the preparation of dimethyl monoaminomaleate by the addition of ammonia to dimethyl acetylenedicarboxylate.

3. Summary and Description of the Invention

There has now been discovered dimethyl diaminomaleate,

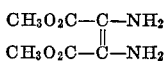

(and its hydrochloride), and a process for preparing it by reaction of 3,4-di(methoxycarbonyl)-1,2,5-selenadiazole (also a new compound) with $H_2S$ in the presence of an alcohol. Dimethyldiaminomaleate is a crystalline solid which is useful as a curing agent for epoxy resins.

In the process of this invention, 1,2,5-selenadiazole-3,4-dicarboxylic acid (D. Shew, "Derivatives of 1,2,5-Thiadiazole and 1,2,5-Selenadiazole," PhD Thesis, University of Indiana, 1959) is converted to its dimethyl ester by known means. 3,4-Di(methoxycarbonyl)-1,2,5-selenadiazole is then treated with at least two molecular equivalents of hydrogen sulfide. This reaction may be carried out at any temperature up to 200° C. and above, preferably in the range from 0–100° C. and more particularly in the range from 20–30° C.

The reaction may be carried out neat. However, it has been found that the rate of the reaction is greatly increased if at least a trace amount of an alcohol is present. Lower-alkyl alcohols (up to 8 carbons; particularly methanol) are preferred.

It is convenient, though not essential, to carry out the reaction in the presence of an added reaction medium which is substantially inert to the reactants and products. Suitable media include alcohols, such as methanol, ethanol, isopropanol, octanol, etc.; ethers, such as diethyl ether, tetrahydrofuran, and dioxane; chloro carbons, such as chloroform, methylene chloride, and carbon tetrachloride; aromatic hydrocarbons, such as benzene and toluene; and other solvents, such as acetonitrile, dimethyl sulfoxide, dimethyl formamide, and dimethyl acetamide. Less inert reaction media include ketones, aldehydes, aliphatic hydrocarbons, and water.

Dimethyl diaminomaleate is isolated from the reaction mixture by known means, e.g., it may be treated with HCl to precipitate it in the form of its hydrochloride. The free ester may then be obtained by reacting a solution of the hydrochloride with a teritary amine to precipitate the corresponding tertiary amine hydrochloride and leave a solution from which dimethyl diaminomaleate is obtained by evaporation of the solvent. The ester may be purified by recrystallizing, if desired.

EMBODIMENTS OF THE INVENTION

There follow some nonlimiting examples illustrative of aspects of the invention. Examples 1 and 2 take the reaction as far as dimethyl diaminomaleate hydrochloride (a new compound) while Example 3 produces dimethyl diaminomaleate. Example A shows a utility of dimethyl diaminomaleate. In these examples, parts and percentages are by weight unless otherwise specified.

EXAMPLE 1

Part A.—3,4-Dimethoxycarbonyl-1,2,5-selenadiazole

A slurry of 5.00 g. (19.3 mmoles) of the potassium salt of 1,2,5-selenadiazole-3,4-dicarboxylic acid in 50 ml. of thionyl chloride was heated to reflux and 3 drops of dimethylformamide was added. An immediate exothermic reaction occurred and the solids went into solution over a 5 minute period. This solution was stirred for 16 hours and thionyl chloride was then removed under reduced pressure. Methanol (50 ml.) was added dropwise to the resulting diacid chloride. Filtration of this solution removed a little red solid and removal of the methanol gave the crude diester. The crude product was taken up in chloroform and this solution was filtered to remove potassium chloride. Removal of the chloroform gave 4.70 g. (98%) of 3,4-dimethoxycarbonyl-1,2,5-selenadiazole as a white powder; m.p. 88–90° C.; IR (Nujol) 1720 cm.$^{-1}$; NMR (CDCl$_3$) 4.02δ (singlet).

Part B.—Dimethyl Diaminomaleate Hydrochloride

Hydrogen sulfide gas was bubbled through a solution containing 1.60 g. (6.4 mmoles) of 3,4-dimethoxycarbonyl-1,2,5-selenadiazole, 30 ml. of tetrahydrofuran, and 3 ml. of methanol. After 20 minutes, selenium began to precipitate as a black powder. Hydrogen sulfide bubbling was continued for another 40 minutes and the solution was then filtered to remove selenium. Anhydrous hydrogen chloride was passed into the filtrate and dimethyl diaminomaleate hydrochloride precipitated as a white powder. This solid was collected, washed with tetrahydrofuran and dried to give 0.95 g. (70.7%) of product. Recrystallization from methanol-tetrahydrofuran gave white needles, m.p. 166–169° C. (dec.).

Anal.—Calcd. for $C_6H_{11}O_4N_2Cl$: C, 34.21; H, 5.27; N, 13.30. Found: C, 33.34; H, 5.45; N, 13.59.

Mass Spectrum: 174 for parent M$^+$-HCl.
IR (Nujol): 3350, 3220, 3100, 2550, 1725, 1680, 1635,
NMR (DMSO-d$_6$): 3.69δ (s, 4.5H), 3.84δ (s, 1.5H), 8.50–1600 and 1555 cm.$^{-1}$.
8.85δ (5H).

EXAMPLE 2

Dimethyl Diaminomaleate Hydrochloride

Hydrogen sulfide gas was bubbled through a solution of 37 g. (0.15 mole) of 3,4-dimethoxycarbonyl-1,2,5-selenadiazole in 500 ml. of tetrahydrofuran and 75 ml.

of methanol for 3 hours. The resulting mixture was stirred for an additional 2 hours and filtered to remove selenium. Hydrogen chloride gas was bubbled through the filtrate until precipitate no longer formed. This precipitate was collected, washed with tetrahydrofuran and dried to give 18.5 g. (60%) of dimethyl diaminomaleate hydrochloride.

EXAMPLE 3

Dimethyl Diaminomaleate

To a solution of 14.5 g. (0.069 mole) of dimethyl diaminomaleate hydrochloride in 400 ml. of methanol was added 7.5 g. (0.074 mole) of triethylamine. The methanol was removed from this solution under reduced pressure and the resulting solid was heated and stirred with 200 ml. of benzene. The benzene mixture was filtered to remove triethylamine·HCl. The benzene was then removed and the resulting solid was recrystallized from ether to give 10.2 g. (85%) of dimethyl diaminomaleate as bright yellow plates, m.p. 101–103° C.

Anal.—Calcd. for $C_6H_{10}O_4N_2$: C, 41.38; H, 5.79; N, 16.09. Found: C, 41.39; H, 6.03; N, 15.84.

IR (KBr): 3430, 3320, 3025, 2970, 1690, and 1575 cm.$^{-1}$.
UV ($CH_3CN$): 373 nm. ($\epsilon$ 8900).
NMR (DMSO-$d_6$): 3.75$\delta$ (s, 6H), 5.12$\delta$ (b, 4H).

As noted above, dimethyl diaminomaleate is a curing agent for epoxy resins. This utility is shown by:

EXAMPLE A

Dimethyl Diaminomaleate as an Epoxy-Cure Agent

A solution of 0.15 g. of dimethyl diaminomaleate in 3.0 g. of Epon® 828 (an uncured epoxy resin, prepared from epichlorohydrin and 2,2-bis(p-hydroxyphenyl)propane) was heated at 150° C. This solution reddened and slowly thickened. After standing at 150° C. for 16 hours, the solution had turned into a hard polymer. A control which did not contain dimethyl diaminomaleate did not thicken upon heating at 150° C. for 16 hours.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the group consisting of dimethyl diaminomaleate hydrochloride dimethyl diaminomaleate.
2. The compound of claim 1 named dimethyl diaminomaleate hydrochloride.
3. The compound of claim 1 named dimethyl diaminomaleate.
4. In the process of preparing the compound of claim 3, the step which comprises reducing 3,4-dimethoxycarbonyl-1,2,5-selenadiazole with hydrogen sulfide.
5. The process of claim 4 accomplished in the presence of a lower-alkyl alcohol.

References Cited

Shaw: PhD Thesis, Univ. of Indiana, 1959.

RICHARD J. GALLAGHER, Primary Examiner

U.S. Cl. X.R.

260—2 N, 298

UNITED STATES PATENT OFFICE
CERTIFICATE OF CORRECTION

Patent No. 3,849,479    Dated November 19, 1974

Inventor(s) Robert Walter Begland

It is certified that error appears in the above-identified patent and that said Letters Patent are hereby corrected as shown below:

Column 4, line 13, after "hydrochloride" insert -- and --.

Signed and Sealed this second Day of December 1975

[SEAL]

Attest:

RUTH C. MASON
Attesting Officer

C. MARSHALL DANN
Commissioner of Patents and Trademarks